Feb. 25, 1947.　　　　W. J. MILLER　　　　2,416,636
APPARATUS FOR APPENDAGING HOLLOW DINNERWARE
Original Filed Jan. 8, 1943　　5 Sheets-Sheet 1

INVENTOR
William J. Miller.
BY
George J. Cuminger
ATTORNEY

Feb. 25, 1947. W. J. MILLER 2,416,636
APPARATUS FOR APPENDAGING HOLLOW DINNERWARE
Original Filed Jan. 8, 1943   5 Sheets-Sheet 2

INVENTOR.
William J. Miller.
BY
George J. Cunningham
ATTORNEY.

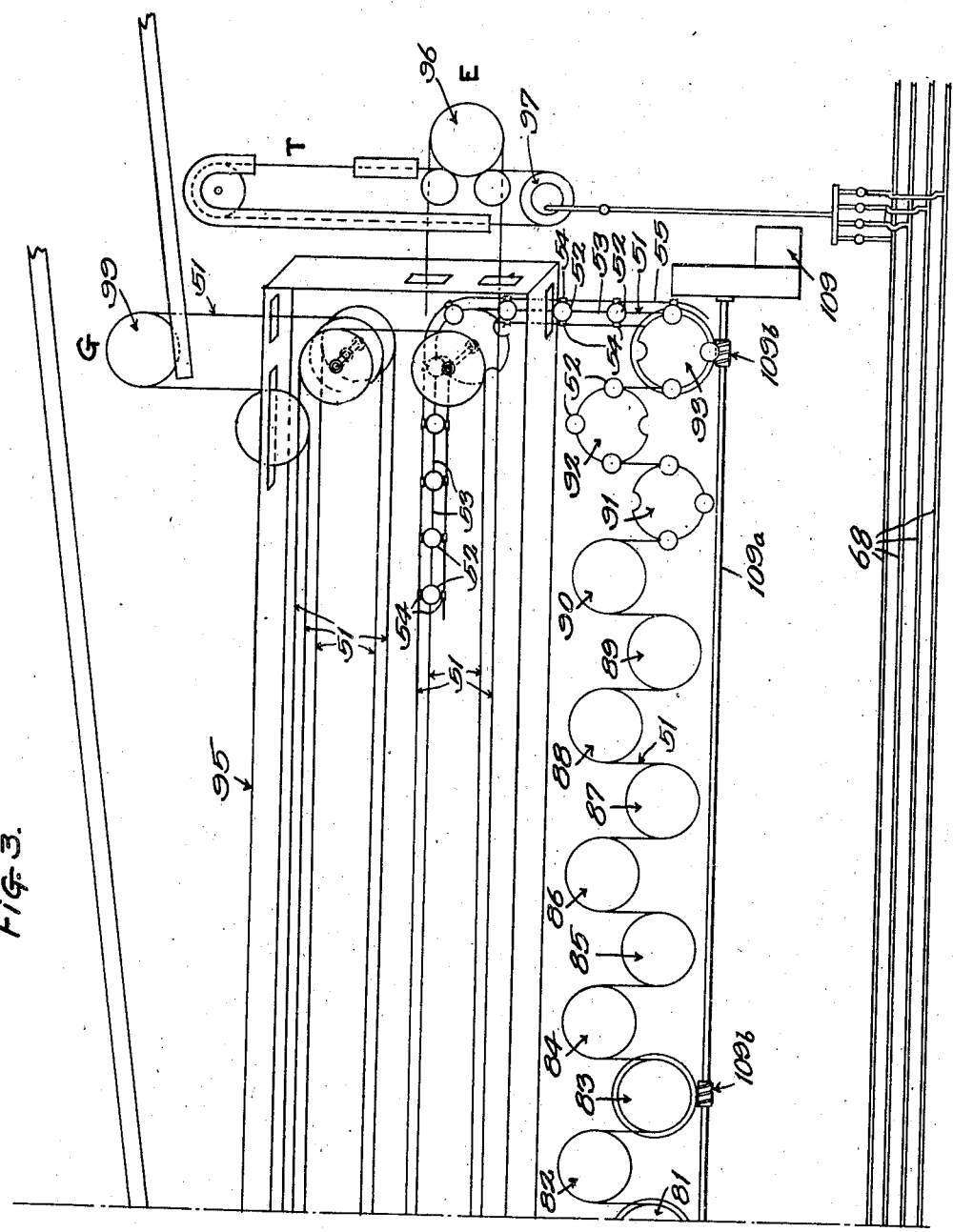

Feb. 25, 1947.  W. J. MILLER  2,416,636
APPARATUS FOR APPENDAGING HOLLOW DINNERWARE
Original Filed Jan. 8, 1943  5 Sheets-Sheet 4
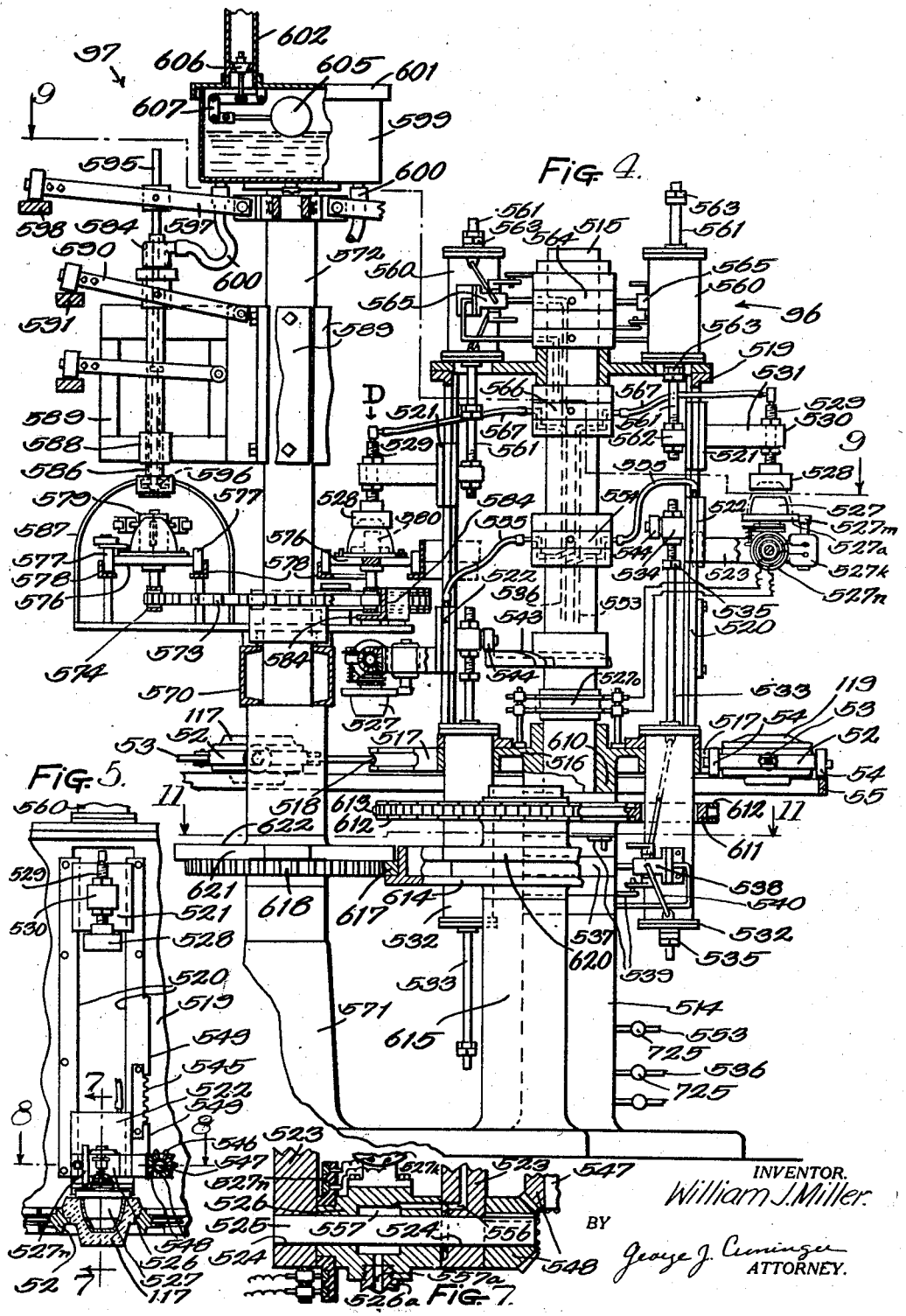
INVENTOR.
William J. Miller.
BY
George J. Cominger
ATTORNEY.

Feb. 25, 1947. W. J. MILLER 2,416,636
APPARATUS FOR APPENDAGING HOLLOW DINNERWARE
Original Filed Jan. 8, 1943 5 Sheets-Sheet 5
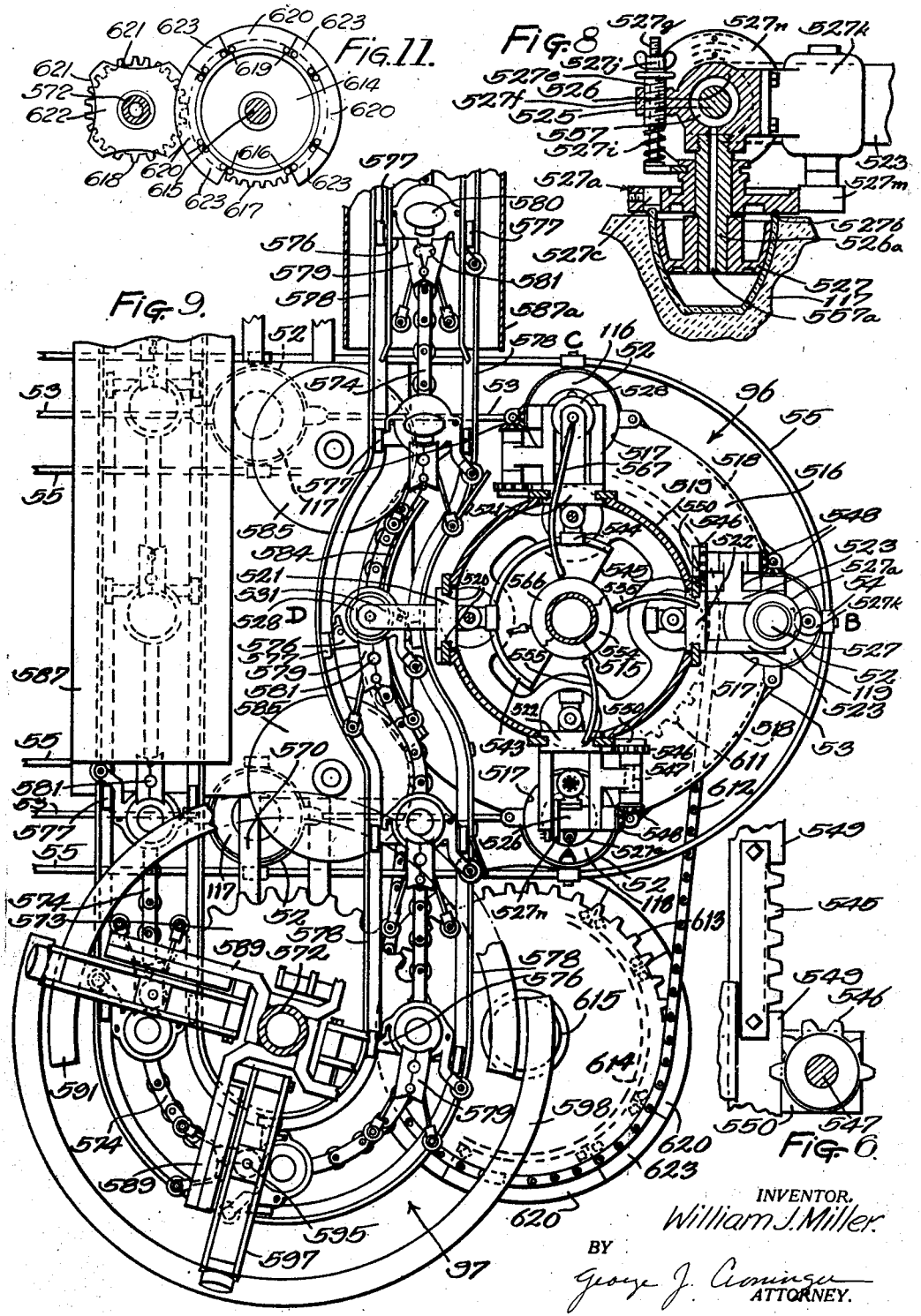
INVENTOR.
William J. Miller
BY
George J. Cominger
ATTORNEY.

Patented Feb. 25, 1947

2,416,636

UNITED STATES PATENT OFFICE 2,416,636

APPARATUS FOR APPENDAGING HOLLOW DINNERWARE

William J. Miller, Swissvale, Pa., assignor to Miller Pottery Engineering Company, Swissvale, Pa., a corporation of Pennsylvania Original application January 8, 1943, Serial No. 471,704. Divided and this application December 30, 1944, Serial No. 570,559½

29 Claims. (Cl. 25—22)

This application is a divisional of my co-pending application S. N. 471,704, filed January 8, 1943.

This invention relates to apparatus for manufacturing pottery ware. It has to do particularly with the appendaging of ware.

The mass production of pottery ware by automatic machine and processes has involved a certain amount of manual intervention, particularly in the treatment and preparation of raw materials and in certain phases of clay, ware and mold transportation, manipulation and processing.

One of the objects of this invention is to place the manufacture of pottery ware on as near a fully automatic basis as possible all the way from the raw material stage to that of dried product ready for first firing. By substantially eliminating the human element in this respect, it is possible to remove handicaps which have heretofore interfered with the continuity, quality and rate of production.

Another and perhaps more important object of this invention is to provide for making simultaneously several different kinds of ware, that is to say, ware having differences in shape, size, decorative pattern or material and even composition by means of a single, unitary mechanical organization. This invention comprehends machinery capable of performing many and different steps, and combinations of steps in the manufacture of pottery ware some of which are conventional steps or operations and others of which afford new and improved ways and means of making pottery ware of this class.

The machinery of the present invention is so constructed and arranged that different sequences of operations may be performed at the same time and variations in the sequences and procedural steps may be made at will and in some cases while the machinery is in operation. Thus, insofar as production diversification is concerned, it may be varied from one which is highly diversified to one wherein substantially little or no diversification occurs. Thus, I provide in a single unitary installation the means of meeting the daily requirements of the average pottery whether it be for large or small amounts of pottery of given shape or design and it is well known that these requirements may vary widely, particularly if the pottery merchandizes a large number of shapes and designs.

Instead of the intermittent fabricating system as illustrated in the patent to Miller No. 2,046,525, I propose to make the present system continuous, somewhat as shown in the application to William J. Miller No. 413,734, filed October 6, 1941. That is to say, from the beginning of fabricating operations to the point when the ware is removed from the dryer and therebeyond, the materials will move in continuous fashion whilst the various fabricating operations are performed. This makes for increased production speeds and raises the capacity of the machinery. Furthermore, clay is supplied to the fabricating portion of the present mechanical organization by a system and apparatus disclosed in application Serial No. 454,716, filed August 13, 1942, by William J. Miller.

In the drawings:

Figs. 1, 2 and 3 taken together to match end to end in their order lengthwise from left to right constitute a diagrammatic view in plan of the entire ware production system of the invention.

Fig. 4 is a view in sectional elevation showing one of the rotary hollow ware, or cup, transfer machines in association with an appendaging machine.

Fig. 5 is a front elevation of one of the ware transferring units of the said transfer machine.

Fig. 6 is an enlarged detail of the gear and rack assembly seen in Fig. 5.

Fig. 7 is a detail plan section taken on the section line 7—7 of Fig. 5 with parts in changed position.

Fig. 8 is an enlarged detail section taken on the section line 8—8 of Fig. 5.

Fig. 9 is a general plan section taken substantially on the section line 9—9 of Fig. 4.

Fig. 10 is a sectional detail of cooperating flatware pick-up and transfer chucks that may be employed for the machine of Fig. 4.

Fig. 11 is a detail plan section of an intermittent motion gearing connection partly seen in Figure 4, and as substantially taken on line 11—11 of Figure 4.

Figure 1:
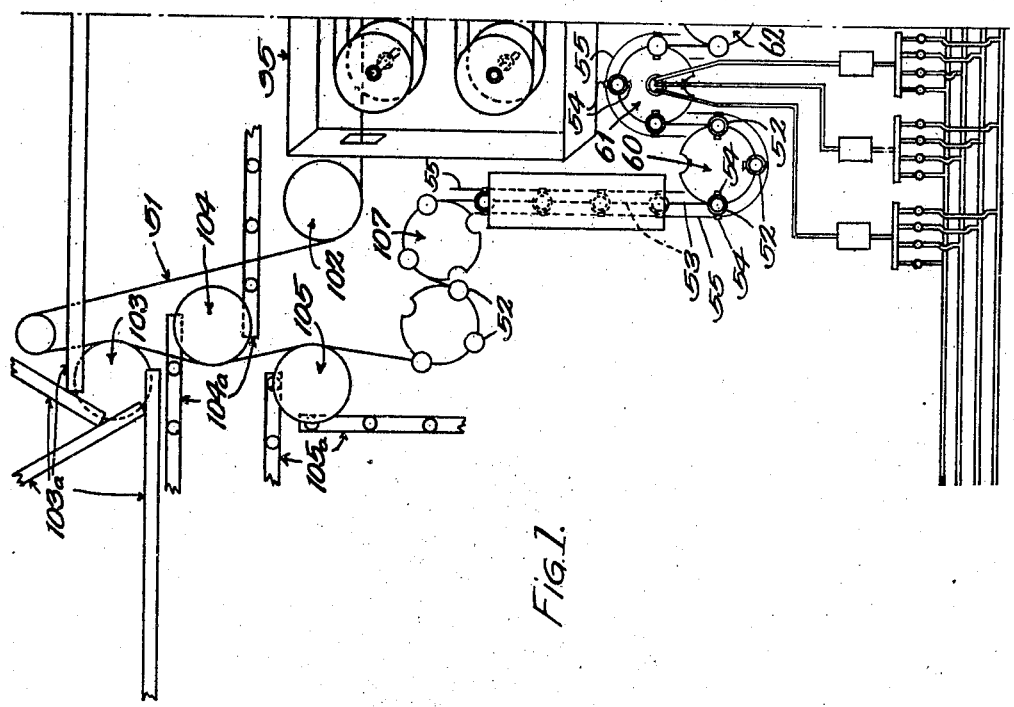
Figure 2:
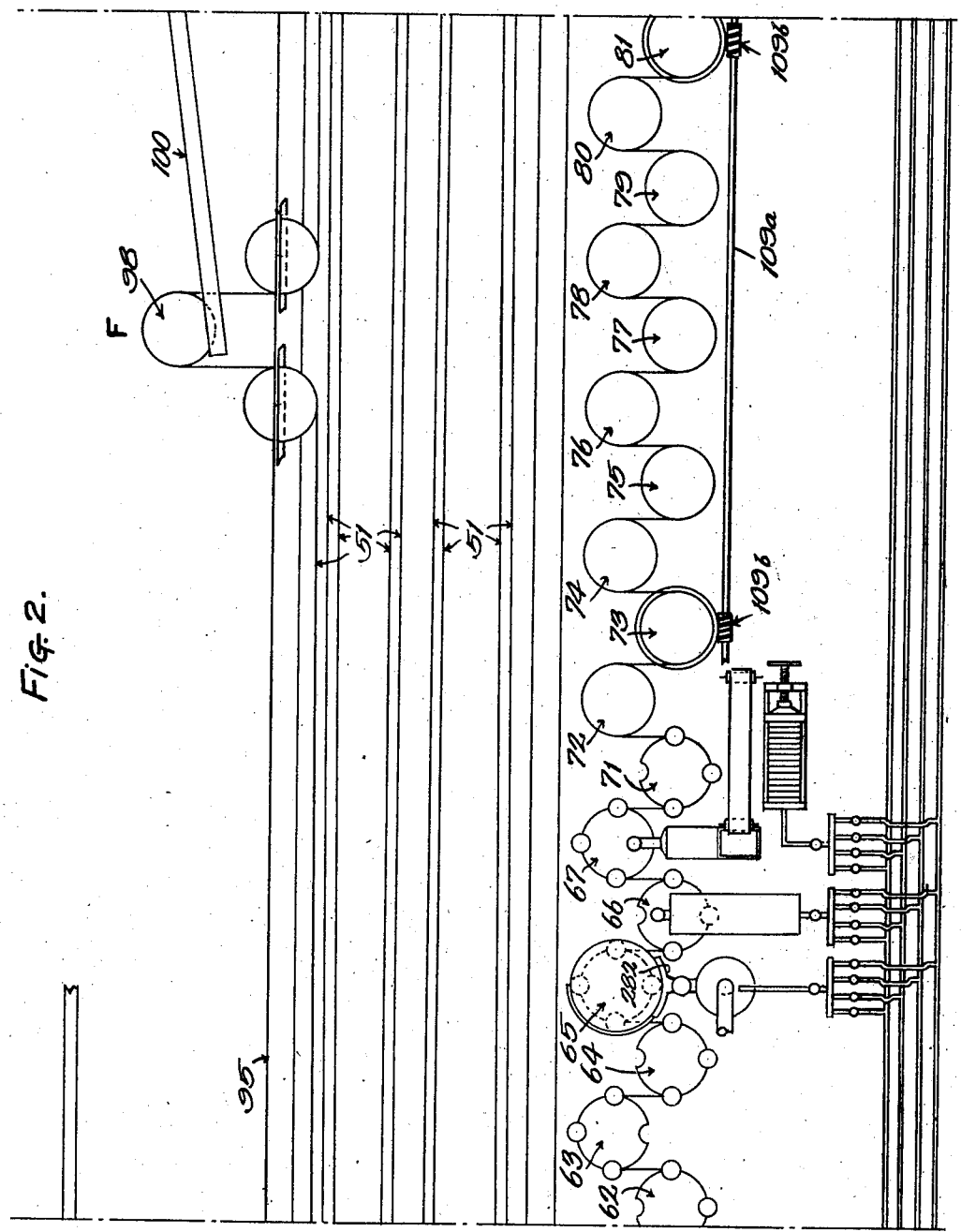

As illustrated diagrammatically in Figs. 1 to 3, the system includes an endless flexible mold conveyor 51 comprising a series of centrally open mold carriers or positioning rings 52 interconnected in equally spaced relation by flexible links or cable sections 53. The conveyor is maintained in a substantially horizontal plane while travelling continuously in a tortuous path about idler sprockets and rotary machines of the system by having outboard supporting rollers 54 riding on rails 55.

The molds for forming four types of ware are carried in the rings 52 in duplicate successive sets which, in the course of the conveyor, are brought into co-operative relation with a series of rotary machines 60, 61, 62, 63 and 64 designed to respectively condition the molds, treat molds for a certain method of ware decoration, treat molds for another method of ware decoration, further condition the treated molds and treat molds for engobing certain ware. These machines are selectively used.

The molds then continue to a series of rotary machines 65, 66 and 67 designed to selectively feed clay charges of similar or of different composition or conditioned clay bodies to the molds and puddle and partially form the charges correlatively with respect to the ware forming surface of the molds prior to feeding. The charge feeding machines may be supplied from an enclosed clay preparation organization R designed to simultaneously and continuously prepare the various clay bodies desired from the various plastic and non-plastic materials required and selectively feed same to the machines.

After receiving the charges, the molds continue to a series of rotary machines 71 to 93, inclusive, designed to selectively perform various forming, conditioning and decorating operations to produce the ware as more fully hereinafter described.

The molds then pass through a drier 95 for an optimum period to dry to leather hardness certain ware to be appendaged, such as cups or the like, which are then conveyed out of the drier at a take-off station E to a rotary machine 96 which transfers same from an upright position in the molds to an inverted position in co-operative relation with an appendaging machine 97, the transfer machine also being designed to fettle and smooth the ware prior to being transferred.

The molds are then returned to the drier and are conveyed past take-off stations F and G located along the conveyor course and are brought at predetermined points into cooperative relation, respectively with rotary machines 98 and 99 designed to transfer other types of ware, each requiring a different drying period, to suitable conveying apparatus 100 and 101 arranged to convey the ware to suitable locations for further treatment. These machines are also designed to fettle, smooth and reverse or reposition the ware incident to transferring same, if desired.

Upon leaving the drier, the molds are advanced to a rotary machine 102 employed to lay the molds or reform thereon partly dried ware that may have become slightly distorted during drying and being especially of use as located, in an installation or an adaptation of the system wherein no type of ware is completely dried in the dryer. However, if the system is adjusted so that the ware leaving the dryer is too dry for the reforming operation, said machine 102 or number of same may be disposed along the conveyor course adjacent one or each of the take-off or transfer stations E, G, and F.

From the reforming machine 102, the molds continue to another rotary transfer machine 103 co-operating with a conveying system 103a to transfer the various types of ware that may remain on the conveyor to any one or a number of selected locations for further treatment, the machine being designed to fettle and smooth the ware and reverse the position thereof if desired.

Upon leaving the transfer machine 103, the empty molds are advanced to a rotary machine 104 co-operating with a conveying system 104a to remove any one or all the molds of each set and transfer same to a suitable location for storage when changing the system over to the production of a different type or types of ware, or when damaged or worn molds require replacement for repair.

The next machine 105 along the course of the conveyor is also of the rotary type designed to co-operate with a conveying system 105a for transferring molds for a certain type or types of ware from one or more storage locations and placing same in the emptied mold carriers in any desired order.

The molds then continue to a rotary conditioning machine 106 designed to remove any foreign matter from the molds, and then continue to another conditioning machine 107 employed to apply to all the molds, or only those which have just been placed on the conveyor, a conditioning medium, such as oil. The molds then pass through a conditioning zone 108 comprising a tunnel within which the air is suitably heated or otherwise conditioned to dry or otherwise put the molds in a proper condition as they return to complete another cycle of operation.

Generally, the machines are of the rotary table type, about the tables of which the conveyor meshes to remain in cooperative relation with each machine during a sufficient portion of its rotation to perform the various operations on the molds or ware.

As seen in Figs. 2 and 3, a power unit 109, such as a combination motor and adjustable speed reducer is employed to constantly drive the machines and mold conveyor in synchronism, through a power shaft 109a and suitable gearing 109b co-operating between same and the rotary machines 73, 81 and 93 which thus serve as driving connections for the conveyor at spaced intervals therealong and whereby the conveyor in turn serves as a driven connection for the rotary machines with which it meshes between said intervals. It is also contemplated that the conveyor and any number or all of the said rotary machines and idlers defining its course may be independently or collectively driven in timed relation.

While the appendaging machine may have for its purpose the application of any form of appendages on certain ware, or diversified ware, in the present case its purpose is to cast handles on hollow ware shapes, particularly cups, while same are carried through the machine in an inverted position on conveying means.

Therefore, the transfer machine has been designed to invert the cup shapes as it transfers same from the mold conveyor to the conveying means of the appendaging machine, and to accommodate any number of cups that may be contained in each successive set of four molds on the mold conveyor. To this end (see Fig. 5), the transfer machine includes a pedestal 514 supporting a stationary hollow central shaft 515 on which rotates a table 516 having in its periphery four equally spaced pockets 517 and grooves 518 therebetween to respectively support the mold carriers and cable sections of the mold conveyor as it travels therearound. On the table, central therewith, is an upright supporting drum 519 having vertical guideways 520, adjacent the pockets 517 and within each of which are reciprocably mounted upper and lower crossheads 521 and 522.

Each lower crosshead has a pair of outwardly extended arms 523 with bearings 524 rotatably supporting a horizontal shaft 525 having secured thereon a supporting head 526 disposed directly over a pocket and having a stem 526a upon which is detachably mounted a vacuum cup pick up chuck 527 (see Fig. 8). Disposed above the supporting heads 526 are vacuum cup transfer chucks 528 carried on the bottom ends of upright stems 529 mounted for vertical adjustment in bearings 330 of outwardly extended arms 531 of the upper crossheads.

In that there is only one cup to be transferred from one of each set of four molds on the conveyor, as illustrated, only one transfer unit of the machine would be in operation while the rest are rendered inoperative.

As each cup mold is carried about the table (Fig. 9), the lower crosshead thereover is reciprocated below and above a starting position, and during the intermediate portion of its stroke above said position, its shaft 525 is oscillated 180 degrees, whereby the pick-up chuck will pick up the cup in the mold at the table station A (Figs. 5–9), invert it, then place same in the transfer chuck thereabove at the table station B, and then lower to its starting position depending from said shaft at the table station C. As the empty cup mold leaves the table from its station C, the lower crosshead dwells at its starting position, the upper crosshead 521 is lowered, and the transfer chuck 528 caused to discharge the cup over a positioning form of the conveying means of the appendaging machine 97 at the table station C.

Each lower crosshead 522 is reciprocated by a fluid-pressure motor 532 supported on the table with the piston rod 533 thereof connected at its top end with a lug 534 on the head and having thereon adjustable stops 535 co-operating with end bearings of the motor cylinder to regulate the limits of movement of the head. Each fluid motor 532 is energized at the proper time from a fluid pressure line 536, by way of a distributor 537 on the central shaft, and a four-way valve 538 operated by arms 539 on said shaft and connected with the ends of the motor cylinder through conduits 540. When each lower crosshead is lowered by its motor from its uppermost limit, it is caused to dwell at its intermediate starting position by a stationary cam dwell segment 543 arranged on the central shaft and engaged by a roller 544 on the lug 534 of the crosshead.

During the intermediate portion of the stroke of each lower crosshead, its shaft 524 is oscillated to reverse the pick-up chuck 525, by an upright rack 545 (Figs. 5, 6, 9) on the drum co-operating with a mutilated gear segment 546 on a shaft 547 carried by the crosshead and driving the former shaft through bevel gears 548. For holding the pick-up chuck in reversed positions during final upward and downward movements of the crosshead, at the ends of the rack 545 are guide bars 549 for co-operating with opposite sides of a square holding block 550 secured to the side of the gear segment 546.

Each pick-up head is vacuumized to pick up a cup, and then vented to release same when raised, by being connected to a vacuum line 553 and then opened to atmosphere through a distributing valve 554 on the central shaft, and a flexible conduit 555 leading therefrom and communicating with the chuck through constantly inter-connected passages 556, 557 and 557a formed in the crosshead, the supporting head 526 and stem 526a thereof respectively (see Fig. 7).

The transfer chucks are raised to receive the cups at the table station A and then lowered to discharge same at the station B, by means of fluid motors 560 arranged on the supporting drum 519 with their piston rods 561 connected at their bottom ends with lugs 562 on the upper crossheads 521. On the piston rods 561 are adjustable stops 563 for engagement with the ends of the motor cylinders to regulate the limits of movement of the transfer chucks. The fluid motors 560 are energized at the proper time by being connected with the pressure line 536 through a distributor 564 and four-way valves 565. The transfer chucks are alternately vacuumized and vented to hold the cups and release same, by being connected with the vacuum line 553 and then opened to atmosphere through a distributor valve 566 and flexible conduits 567 connecting with central passages in the stems 529 of the chucks.

Associated with each pick-up chuck 527 is a device 527a which, as a cup is picked up by the chuck, smooths or rounds off the upper edge of the cup (see Fig. 8). This device may comprise a wheel rotatably mounted on the stem 526a carrying the chuck and having a concentric rounded groove 527c detachably mounted on the wheel and interposed in said groove to round the edge of the cup as the wheel is rotated. The wheel may be yieldably held on the stem 526a in longitudinally adjusted operating position by means of a hollow adjusting screw 527e threaded in a bearing 527f of the supporting head and resiliently connected with the wheel through a bolt 527g extending therethrough having a yoke and groove connection 527h with the hub of the wheel, and a coiled spring 527i held under compression on the bolt between the screw and the yoke connection by a nut 527j for regulating the amount of compression of the spring.

The wheel 527a may be rotated as the chuck 527 is picking up a cup and for an optimum period thereafter, by an electric motor 527k carried on the support head 526 and driving the wheel through a pulley and belt drive connection, or by having a friction drive pulley 527m on its shaft in driving engagement with the edge of the wheel. Each of the motors may be energized at the proper time from suitable power lines, by way of a drum type distributor 527n on each supporting head 526 and a suitable combination distributor and switch 527o on the central shaft, as seen in Figs. 4 and 7.

The appendaging machine is somewhat characteristic of the casting machine forming the subject matter of my co-pending application, Serial No. 392,276, filed May 7, 1941. Said machine includes an elongated frame 570 having a pedestal 571 at one end supporting a rotating upright shaft 572 on which is a drive sprocket 573 supporting one end of an endless sprocket chain conveyor 574 whose other end is supported on an idler sprocket 575 at the other end of the frame. (See Figs. 3, 4 and 9).

On the conveyor chain 574 are a series of equally spaced apart carriers 576 having side rollers 577 travelling on rails 578 to support and position the carriers as they travel with the chain. On each carrier is a two-part handle slip casting mold 579 and a positioning form 580 to position a cup in co-operative relation with the casting mold in casting a handle on the cup, with each mold having a well and sprue 581 to receive the clay in slip form.

The conveyor chain 574 is intermittently driven and arranged that upon each movement thereof, a carrier is caused to travel about the axis of the transfer machine 96 in register below a transfer chuck 528, whereby a cup discharged from the chuck will be deposited on the positioning form 580 of the carrier at the station D of said machine. The carriers are caused to travel about the axis of the transfer machine by the conveyor 574 being accordingly deflected in its path along an arcuate guide member 584 and about idlers 585 at the ends thereof.

After receiving a cup, each carrier then continues about the drive sprocket 573 where one of a number of feeder heads 586 carried on the shaft 572 is lowered over the sprue of the mold and charges same with slip clay. The feeder head 586 is then raised off the mold as the carrier leaves the sprocket and continues through a tunnel 587 with controlled atmosphere, where the handle casting in the mold is suitably hardened and united with the cup.

As the carriers 576 return from the tunnel to the station D of the transfer machine, the molds are temporarily automatically opened at a take-off station T (Fig. 3), to permit the removal of the handled cups therefrom, and then continue in open position through a tunnel 587a within which the molding surfaces of the molds are conditioned before being closed preparatory to another cycle of operation.

Each feeder head 586 comprises an upright pipe loosely received in a bearing 588 of a bracket 589 on the shaft 572, and being pivoted to a lever 590 co-operating with a stationary cam 591 to raise the pipe and control lowering speed of same onto a casting mold. At the top end of the pipe is a bearing 594 supporting a valve rod 595 which, after the pipe is lowered, opens a poppet valve 596 at the bottom end of the pipe to permit discharge of the clay slip therefrom. Upon final downward movement of the pipe, the valve rod is stopped from movement therewith to open the valve, by a lever 597 pivotally connected with the rod and co-operating with a stationary cam 598.

On the top end of the shaft 572 is a central supply tank 599 from which the clay slip is supplied to the pipes 586 by way of flexible conduits 600.

The top of the tank is covered by a stationary cover plate 601 from which continues a conduit 602 opening into the tank and communicating with the clay supply lines 68 of the clay preparation system R by way of valved branches 603 thereof (Fig. 2) and a header 604, whereby the tank may be selectively supplied from any one of the headers 38 of said system, with the desired type of clay slip suitable for the casting of the handles. The clay slip may be maintained at a constant level in the tank by means of a float 605 controlling the opening and closing of a poppet valve 606 in the outlet of the conduit 602 through a lever and link connection 607, as seen in Fig. 4.

For driving the appendaging machine in timed relation with the transfer machine, mounted on the hub 510 of the transfer table 516 is a sprocket wheel 611 driving through a sprocket chain 612, a similar sized sprocket 613 on the hub of a wheel 614 mounted on an upright shaft 615 supported on the base of the pedestal 571. For each transfer unit that is functioning, there is provided for attachment to said wheel in like order, by bolts 616, a gear segment 617 (Fig. 9) for intermittently meshing with a gear 618 secured on the shaft 572 of the appendaging machine, whereby upon one complete rotation of the table, the conveyor will be so intermittently advanced as to cause the carriers thereon to successively receive ware from that number of transfer units that may be functioning.

For each transfer unit that is not functioning, there is provided for attachment to said wheel in like order, by bolts 619, a concentric cam dwell segment 620 for co-operating within correlatively formed pockets 621 in the periphery of a star wheel 622 attached to the side of the gear 618 for holding the conveyor 574 stationary between movements thereof.

As shown, the carriers 576 are spaced at intervals on the conveyor chain 574 less than the distance between the transfer units about the axis of the transfer table so that a maximum number of the carriers may be employed. To compensate for this difference, while at the same time permitting successive carriers to travel in unison with the transfer units, on the wheel 614 are secured at equally spaced intervals thereabout four permanent cam dwell segments 623 between which the detachable cam dwell segments 620 form extensions thereof.

I claim:

1. Apparatus for manufacturing hollow dinnerware and the like comprising, a movable support for carrying formed ware to a transfer zone, means for appendaging ware including a movable ware support for carrying formed ware through an appendaging zone and mechanism in said transfer zone movable with both supports formed for removing ware from the first support and inverting the ware and depositing the ware on said second support.

2. Apparatus for manufacturing hollow dinnerware and the like comprising, a traveling support for carrying formed ware to a transfer zone, traveling means for appendaging ware including a ware support for carrying formed ware through an appendaging zone and traveling transfer mechanism movable with both supports formed for removing ware from the first support and depositing the ware on said second support.

3. Apparatus for manufacturing hollow dinnerware and the like comprising, a movable support for carrying formed ware to a transfer zone, means for appendaging ware including a ware support for carrying formed ware through an appendaging zone and an angularly movable ware transfer means in said transfer zone movable with both supports for removing ware from the first support and depositing the ware in inverted position on said second support.

4. Apparatus for manufacturing hollow dinnerware and the like comprising, a movable support for carrying formed ware to a transfer zone, means for appendaging ware including a ware support for carrying formed ware through an appendaging zone and means in said transfer zone movable with one support and then the other formed for removing ware from the first support, finishing a surface of the ware and depositing the ware in inverted position on said second support.

5. Apparatus for manufacturing hollow dinnerware and the like comprising, a traveling support for carrying formed ware to a transfer zone, means for appendaging ware including a traveling ware support for carrying formed ware through an appendaging zone, and a traveling ware transfer means in said transfer zone movable with both supports for removing ware from the first support, and depositing the ware on said second support including means for finishing a surface of the ware.

6. Apparatus for manufacturing hollow dinnerware and the like comprising, a movable support for carrying formed ware, means for appendaging ware including a support for carrying formed ware through an appendaging zone, and ware transfer mechanism supported to move with said supports and to transfer ware therebetween whilst in motion.

7. Apparatus for manufacturing hollow dinnerware and the like comprising, a support for carrying formed ware to a transfer zone, means for appendaging ware including a support for carrying ware through an appendaging zone and an angularly movable ware transfer means in said transfer zone having ware transfer members arranged to co-operate with each other and to travel with said first named support for removing ware therefrom and to travel with said second named support for depositing ware on said second named support.

8. Apparatus for manufacturing hollow dinnerware and the like comprising, a support for carrying formed ware to a transfer zone, appendaging means including a ware support for carrying formed ware through an appendaging zone, means in said transfer zone formed for removing ware from the first support and depositing the same on said second support and means for moving said supports and transfer mechanism in timed relation.

9. Apparatus for manufacturing hollow dinnerware and the like comprising, a traveling support for carrying formed ware to a transfer zone, an appendaging means including a support for carrying formed ware through an appendaging zone and an angularly movable ware transfer mechanism rotating continuously about an axis for removing ware directly from the first support and carrying the ware to and depositing the same on the second support.

10. Apparatus for manufacturing hollow dinnerware and the like comprising, a traveling support for carrying formed ware to a transfer zone, appendaging means including a support for carrying formed ware through an appendaging zone and angularly movable transfer mechanism rotatable about an axis arranged to lift ware from the first support, invert the ware and deposit the same in inverted position on said second support.

11. Apparatus for manufacturing hollow dinnerware and the like comprising, an endless conveyor having supports for carrying ware to a transfer zone, an endless conveyor having supports for carrying ware through an appendaging zone, ware transfer means for removing ware from the first named support and depositing the same on said second named support and clay feeding mechanism in said appendaging zone arranged to move with said second named supports and supply clay for the appendaging operation.

12. Apparatus for manufacturing hollow dinnerware and the like comprising, an endless conveyor having supports for carrying ware to a transfer zone, an endless conveyor including supports for carrying formed ware through an appendaging zone and molding means for forming appendages, ware transfer means arranged to remove ware from the supports of the first conveyor and deposit ware on the supports of the second conveyor and an angularly movable discharge nozzle arranged to travel with and supply clay to the molds associated with said second named supports.

13. Apparatus for manufacturing hollow dinnerware and the like comprising, an endless conveyor having supports for carrying ware to a transfer zone, a track for supporting said supports in said zone, an endless conveyor having supports for carrying molds through an appendaging zone, a track for supporting said last named supports in said appendaging zone, transfer mechanism for removing ware from the first named supports and depositing the ware on said second named supports and clay supplying means in said appendaging zone for feeding clay from which appendages are made and attached to the ware.

14. Apparatus for manufacturing hollow dinnerware and the like comprising, an endless conveyor having a support for carrying formed ware to a transfer zone, an endless conveyor for transporting appendaging means including a support for formed ware and a partible mold through an appendaging zone, means for transferring ware from the first named support to the second named support, means for feeding clay in said appendaging zone to the mold of the second support and means for opening and closing said partible mold.

15. Apparatus for manufacturing hollow dinnerware and the like comprising, an endless conveyor having supports for carrying formed ware to a transfer zone, an endless conveyor for carrying mold supports through an appendaging zone, an angularly movable ware transfer means for removing ware from the first named support and depositing ware on said second named support said transfer means including a member for picking up ware from the first support, inverting the ware and elevating the same and a second transfer member for receiving ware from the first transfer member and depositing the ware in inverted position on the second named support.

16. Apparatus for manufacturing hollow dinnerware and the like comprising, a conveyor having supports for carrying formed ware, an endless conveyor for carrying mold supports through an appendaging zone, a continuously moving, rotatable ware transfer mechanism formed for removing ware from the supports of one of said conveyors and carrying the same to and depositing the same on the ware supports of the other conveyor.

17. Apparatus for manufacturing hollow dinnerware and the like comprising, an endless conveyor having supports for carrying formed ware through a transfer zone, an endless conveyor for carrying ware supports through an appendaging zone, angularly movable means for supplying clay from which appendages are fashioned in said appendaging zone and an angularly movable transfer mechanism in said zone for removing ware from said first support and carrying the ware to and depositing the ware on said second support.

18. Apparatus for manufacturing hollow dinnerware and the like comprising, a mold conveyor formed for carrying molds with ware thereon to a ware transfer zone, a conveyor for transporting appendaging means having ware supports through an appendaging zone, ware transfer mechanism for removing formed ware from the molds of the mold conveyor and carrying the ware to and depositing the ware on the supports of the second conveyor and a nozzle movable with said second named conveyor through which clay from which appendages are formed is supplied to said appendaging means.

19. Apparatus for manufacturing hollow dinnerware and the like comprising, an endless conveyor having supports for carrying ware to a transfer zone, an endless conveyor having ware supports for carrying ware through an appendaging zone, a rotatable ware transfer member for removing ware from the first named support and carrying the same to and depositing ware on said second named supports, a rotatable clay feeder in said appendaging zone and drive mechanism for moving said conveyors and rotating said ware transferring and clay feeding means.

20. Apparatus for manufacturing hollow dinnerware and the like comprising, an endless conveyor having supports for carrying molds to a transfer zone, an endless conveyor having appendaging means including ware supports for carrying ware through an appendaging zone, a rotatable ware transferring means in said transfer zone for removing ware from the first support, inverting the same and finishing a surface thereof and depositing the ware on the supports of the appendaging means, rotatable clay feeder in the appendaging zone for supplying clay to the appendaging means, and drive means for moving said conveyors and rotating said transfer means and said clay feeding means.

21. Dinnerware manufacturing apparatus including, a turntable having peripheral recesses, a mold conveyor provided with ring shaped mold seats engageable in the recesses, a ware appendaging conveyor operating at another level relative to the mold conveyor but located adjacent thereto and to the turntable, appendaging means and ware supports carried by said ware conveyor, a ware transfer means mounted above each recess and movable therewith, means for moving said turntable, conveyors and ware transfer means and means for operating said transfer means during such movement to lift ware from the molds and deposit the same on the ware supports of the ware appendaging conveyor.

22. Dinnerware manufacturing apparatus comprising, a conveyor having a plurality of ware supports and associated appendaging means attached thereto, a turntable adjacent said conveyor, a mold conveyor adjacent said turntable, means for driving said conveyors and turntable continuously, a ware pickup means rotating with said turntable and means for operating said ware pickup means to remove ware from the mold conveyor and place the same on the ware supports of the other conveyor.

23. Dinnerware manufacturing machinery comprising, a moving support for carrying ware through an appendaging zone, means for appendaging ware in said zone, a continuously moving ware conveyor for transporting ware to said zone and ware pickup means arranged to travel first with the ware conveyor and then with one of the supports for transferring ware therebetween.

24. Dinnerware manufacturing machinery including, a moving support for carrying ware through an appendaging zone, means, movable with said support for appendaging ware in said zone, a continuously moving ware conveyor for transporting ware to a transfer point and a continuously moving ware transfer having ware transfer members moving with said support and said conveyor for picking up ware from the conveyor and transferring the same to the support.

25. Dinnerware manufacturing machinery including, a movable appendage casting means arranged to travel in an endless path through an appendaging zone, a ware pick up member continuously rotatable about an axis and movable into and out of vertical register with said casting means, a ware conveyor adjacent said ware pick up member and movable about the axis and means for operating said ware pick up means to lift ware from the conveyor when traveling about the axis and transfer the ware to the casting means.

26. Apparatus for making appendaged dinnerware comprising, an appendaging machine, a mold conveyor for carrying ware to said machine, a continuously rotating ware transfer operating between the appendaging machine and the mold conveyor, a common drive for the machine, conveyor and transfer and means for moving the transfer up and down over the appendaging machine and mold conveyor to lift ware from the mold conveyor and place it on the appendaging machine.

27. Apparatus for manufacturing hollow dinnerware and the like comprising, support for carrying formed ware to a transfer zone, automatically operable means for appendaging ware including ware supports for carrying formed ware through an appendaging zone, automatically operable transfer means in said transfer zone constructed and arranged for removing ware from the first support and inverting the ware and depositing the ware on said second support and means for moving the transfer means with both supports.

28. Apparatus for manufacturing hollow dinnerware and the like comprising, traveling supports for carrying formed ware to a transfer zone, automatically operable means for appendaging ware including ware supports for carrying formed ware through an appendaging zone, automatically operable, traveling transfer mechanism constructed and arranged for moving ware from the first support and depositing the ware on said second support and means for moving the transfer mechanism with both supports.

29. Apparatus for manufacturing hollow dinnerware and the like comprising, supports for carrying formed ware to a transfer zone automatically operable means for appendaging ware including ware supports for carrying formed ware through an appendaging zone, automatically operable, angularly movable, ware transfer means in said transfer zone for removing ware from the first support and depositing the ware in inverted position on said second support and means for moving the transfer means with both supports.

WILLIAM J. MILLER.

REFERENCES CITED

The following references are of record in the file of this patent:

UNITED STATES PATENTS

| Number | Name | Date |
| --- | --- | --- |
| 2,294,926 | Miller | Sept. 8, 1942 |